(12) United States Patent
Jolivet et al.

(10) Patent No.: US 7,520,434 B2
(45) Date of Patent: Apr. 21, 2009

(54) READER FOR READING MACHINE-READABLE SYMBOLS, FOR EXAMPLE BAR CODE SYMBOLS

(75) Inventors: Denis Jolivet, Frouzins (FR); H. Sprague Ackley, Toulouse (FR)

(73) Assignee: Intermec IP Corp., Everett, WA (US)

( * ) Notice: Subject to any disclaimer, the term of this patent is extended or adjusted under 35 U.S.C. 154(b) by 385 days.

(21) Appl. No.: 11/149,452

(22) Filed: Jun. 8, 2005

(65) Prior Publication Data

US 2006/0097053 A1 May 11, 2006

Related U.S. Application Data

(60) Provisional application No. 60/583,406, filed on Jun. 25, 2004.

(51) Int. Cl.
*G06K 9/22* (2006.01)
(52) U.S. Cl. .......................... 235/462.45; 235/462.43; 235/462.32
(58) Field of Classification Search ............ 235/462.36, 235/462.45, 472.01, 462.38, 454, 498, 462.1, 235/462.09, 462.32, 462.43
See application file for complete search history.

(56) References Cited

U.S. PATENT DOCUMENTS

| | | | |
|---|---|---|---|
| 4,820,911 A | 4/1989 | Arackellian et al. | |
| 4,933,538 A | 6/1990 | Heiman et al. | |
| 4,988,852 A | 1/1991 | Krishnan | 235/462 |
| 5,378,883 A | 1/1995 | Batterman et al. | 235/472 |
| 5,550,364 A | 8/1996 | Rudeen | 235/462 |
| 5,627,360 A | 5/1997 | Rudeen | 235/462 |
| 5,640,001 A | 6/1997 | Danielson et al. | 235/472 |
| 5,690,418 A | 11/1997 | Hsiung | 362/259 |
| 5,734,153 A | 3/1998 | Swartz et al. | 235/472 |
| 5,756,981 A | 5/1998 | Roustaei et al. | 235/462 |
| 5,770,841 A | 6/1998 | Moed et al. | |
| 5,880,451 A | 3/1999 | Smith et al. | |
| 6,003,775 A | 12/1999 | Ackley | 235/472.01 |
| 6,060,722 A | 5/2000 | Havens et al. | |
| 6,095,422 A | 8/2000 | Ogami | |
| 6,138,915 A | 10/2000 | Danielson et al. | 235/472.02 |
| 6,216,950 B1 | 4/2001 | Ohkawa et al. | |
| 6,223,988 B1 | 5/2001 | Batterman et al. | |
| 6,257,491 B1* | 7/2001 | Tan et al. | 235/462.36 |
| 6,330,974 B1 | 12/2001 | Ackley | 235/472.01 |
| 6,332,576 B1* | 12/2001 | Colley et al. | 235/462.32 |
| 6,332,577 B1 | 12/2001 | Acosta et al. | |
| 6,340,114 B1 | 1/2002 | Correa et al. | 235/462.22 |
| 6,398,112 B1 | 6/2002 | Li et al. | 235/462.01 |
| 6,417,840 B1 | 7/2002 | Daniels | 345/158 |

(Continued)

OTHER PUBLICATIONS

U.S. Appl. No. 11/280,955, filed Nov. 16, 2005, Thuries.

(Continued)

*Primary Examiner*—Edwyn Labaze
(74) *Attorney, Agent, or Firm*—Seed IP Law Group PLLC

(57) ABSTRACT

A machine-readable symbol reader for reading machine-readable symbols such as barcode symbols employs a first reflective surface having a first perimeter to create a pointer beam, and a movable second reflective surface with a second perimeter small than the first perimeter to create a scanning beam. The pointer and scanner beams may exist simultaneously and may be formed from a same illumination beam.

32 Claims, 11 Drawing Sheets

U.S. PATENT DOCUMENTS

| | | | |
|---|---|---|---|
| 6,491,223 B1 | 12/2002 | Longacre, Jr. et al. | 235/462.01 |
| 6,572,019 B1 | 6/2003 | Rando et al. | |
| 6,641,042 B1 | 11/2003 | Pierenkemper et al. | |
| 6,641,046 B2 | 11/2003 | Durbin | 235/472.01 |
| 6,659,350 B2 | 12/2003 | Schwartz et al. | 235/462.42 |
| 6,708,883 B2 | 3/2004 | Krichever | |
| 6,729,546 B2 | 5/2004 | Roustaei | 235/462.45 |
| 7,007,844 B2 * | 3/2006 | Barkan et al. | 235/454 |
| 7,090,137 B1 | 8/2006 | Bennett | |
| 7,121,469 B2 | 10/2006 | Dorai et al. | |
| 2002/0054433 A1 * | 5/2002 | Tacklind et al. | 359/618 |
| 2002/0131139 A1 * | 9/2002 | Mandella et al. | 359/215 |
| 2004/0206823 A1 | 10/2004 | Blake et al. | |
| 2005/0274806 A1 | 12/2005 | Dant | 235/462.21 |
| 2006/0097053 A1 | 5/2006 | Jolivet et al. | |
| 2006/0261167 A1 | 11/2006 | Ray et al. | |
| 2007/0040012 A1 | 2/2007 | Lin et al. | |
| 2007/0084926 A1 | 4/2007 | Lopez et al. | |
| 2007/0164112 A1 | 7/2007 | Dant | |

OTHER PUBLICATIONS

U.S. Appl. No. 60/681,779, filed May 17, 2005, Ray et al.
U.S. Appl. No. 60/709,709, filed Aug. 18, 2005, Lopez et al.
U.S. Appl. No. 60/756,319, filed Jan. 4, 2006, Dant.

* cited by examiner

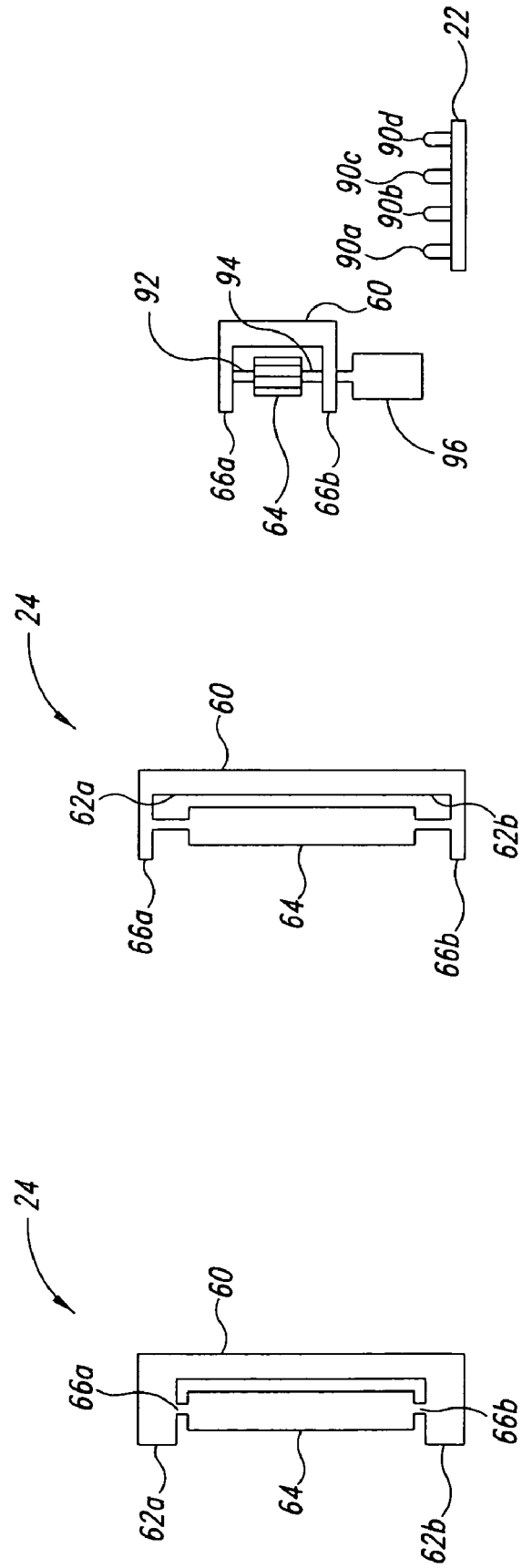

READER FOR READING MACHINE-READABLE SYMBOLS, FOR EXAMPLE BAR CODE SYMBOLS

CROSS REFERENCE TO RELATED APPLICATIONS

This application claims the benefit under 35 U.S.C. § 119 (e) of U.S. Provisional Patent Application No. 60/583,406, filed Jun. 25, 2004.

BACKGROUND OF THE INVENTION

1. Field of the Invention

This disclosure generally relates to the field of automatic data collection (ADC), and more particularly to machine-readable symbol readers for reading machine-readable symbols, for example bar code symbols, area or matrix code symbols, and/or stack code symbols.

2. Description of the Related Art

A variety of machine-readable symbol readers for reading machine-readable symbols are known. Such readers typically employ one of two fundamental approaches, scanning or imaging.

In scanning, a focused beam of light is scanned across the machine-readable symbol, and modulated light returned from the machine-readable symbol is received by the reader and demodulated. With some scanning-type machine-readable symbol readers, the machine-readable symbol is moved past the reader. With others, the reader is moved past the machine-readable symbol. More commonly, the reader moves a beam of light across the machine-readable symbol, while the reader and machine-readable symbol remain approximately fixed with respect to one another. Demodulation typically includes an analog-to-digital conversion and a decoding of the resulting digital signal.

Typically, scanning-type machine-readable symbol readers employ a light source that produces a scanning beam that may not be visible in the human range of visual perception. For example, the machine-readable symbol reader may employ a source such as a laser diode, which emits electromagnetic radiation in the infrared range. Even where the light source is in the visible range, the scanning beam is often difficult or impossible to see, for example in bright light conditions and/or at long read ranges. This makes it difficult for the user to properly aim the machine-readable symbol reader at a desired target. It is particularly difficult where targets are closely spaced, for example where carried on items stacked on a pallet or in a warehouse.

Previous attempts to solve this problem have included using a brighter scanning beam. A brighter scanning beam, however, has a number of disadvantages, including high power consumption and limits placed on the power of lasers by various administrative agencies such as the Occupational Safety and Health Administration (OSHA). Another approach has been to provide a separate light source that emits a highly visible beam of light, commonly referred to as a pointer beam. This approach typically includes the use of a multi-function trigger, allowing a user to illuminate a target with the pointer beam, and then turning the pointer beam OFF and turning the scanning beam ON. This prevents the pointer beam from interfering with the reception of the scanning beam reflected or backscattered by the machine-readable symbol. Again, this approach has a number of disadvantages including high power consumption, and may lead to inaccurate scanning since the pointer beam and scanning beam are not on at the same time.

There is a need for a low-cost machine-readable symbol reader with an aiming mechanism that ensures reliable aiming. There is also a need for a low-cost machine-readable symbol reader that does not require a multi-position or multi-function trigger. There is a further need for a low-cost solid state machine-readable symbol reader. Further, there is a need for a low-cost machine-readable symbol reader where the pointer beam and the scanning beam are on at the same time to allow accurate aiming and scanning.

BRIEF SUMMARY OF THE INVENTION

In one aspect, a device to scan machine-readable symbols comprises: a first reflective surface having an outer perimeter; a second reflective surface having an outer perimeter, the outer perimeter of the second reflective surface being smaller than the outer perimeter of the first reflective surface, the perimeter of the second reflective surface disposed in a volume formed by a normal projection of the perimeter of the first reflective surface such that at least a portion of the second reflective surface is exposable to illumination of the first reflective surface, and wherein the second reflective surface is mounted for movement about at least a first axis to produce a scanning motion.

In another aspect a device to scan a machine-readable symbols comprises: pointer beam means for directing a pointer beam externally from the device; scanner beam means for directing a scanner beam externally from the device while the pointer beam is directed externally from the device, the scanner beam scanning along at least one axis perpendicular to the direction in which the scanner beam is directed externally from the device; and illumination means for illuminating at least a portion of the pointer beam means at a same time as at least a portion of the scanner beam means.

In a further aspect, a method of scanning a machine-readable symbol comprises: oscillating a scanner reflective surface having a first outer perimeter with respect to an illumination source and a fixed reflective surface being a second outer perimeter greater than the first outer perimeter; and illuminating the scanner reflective surface and at least a portion of the fixed reflective surface exposed beyond the first perimeter at a same time with a same illumination beam.

In yet a further aspect, a method of manufacturing an optical system for a machine-readable symbol reader comprises: forming a reflective surface on a substrate; positioning the reflective surface into a first reflective surface having a first outer diameter and a second reflective surface having a second outer diameter, the second diameter concentrically disposed within the first outer diameter and the second reflective surface rotationally supported from the substrate by at least a pair of torsion arms.

BRIEF DESCRIPTION OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3 is a cross-sectional view of the MEMS reflector assembly according to another illustrated embodiment, where a second reflective surface is recessed with respect to a first reflective surface.

FIG. 4 is a cross-sectional view of a MEMS reflector assembly according to still a further illustrated embodiment, where a first reflective surface is recessed with respect to a second reflective surface.

FIG. 6 is a cross-sectional view of a set of light-emitting diodes suitable for use in one illustrated embodiment.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol readers, light sources such as laser and light emitting diodes, optics such as lens assemblies, and control subsystems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. As used herein and in the claims, the term "light" refers to electromagnetic radiation in the visible and non-visible portions of the electromagnetic spectrum, for example the infrared portion of the spectrum.

The headings provided herein are for convenience only and do not interpret the scope or meaning of the embodiments.

Figure 1:
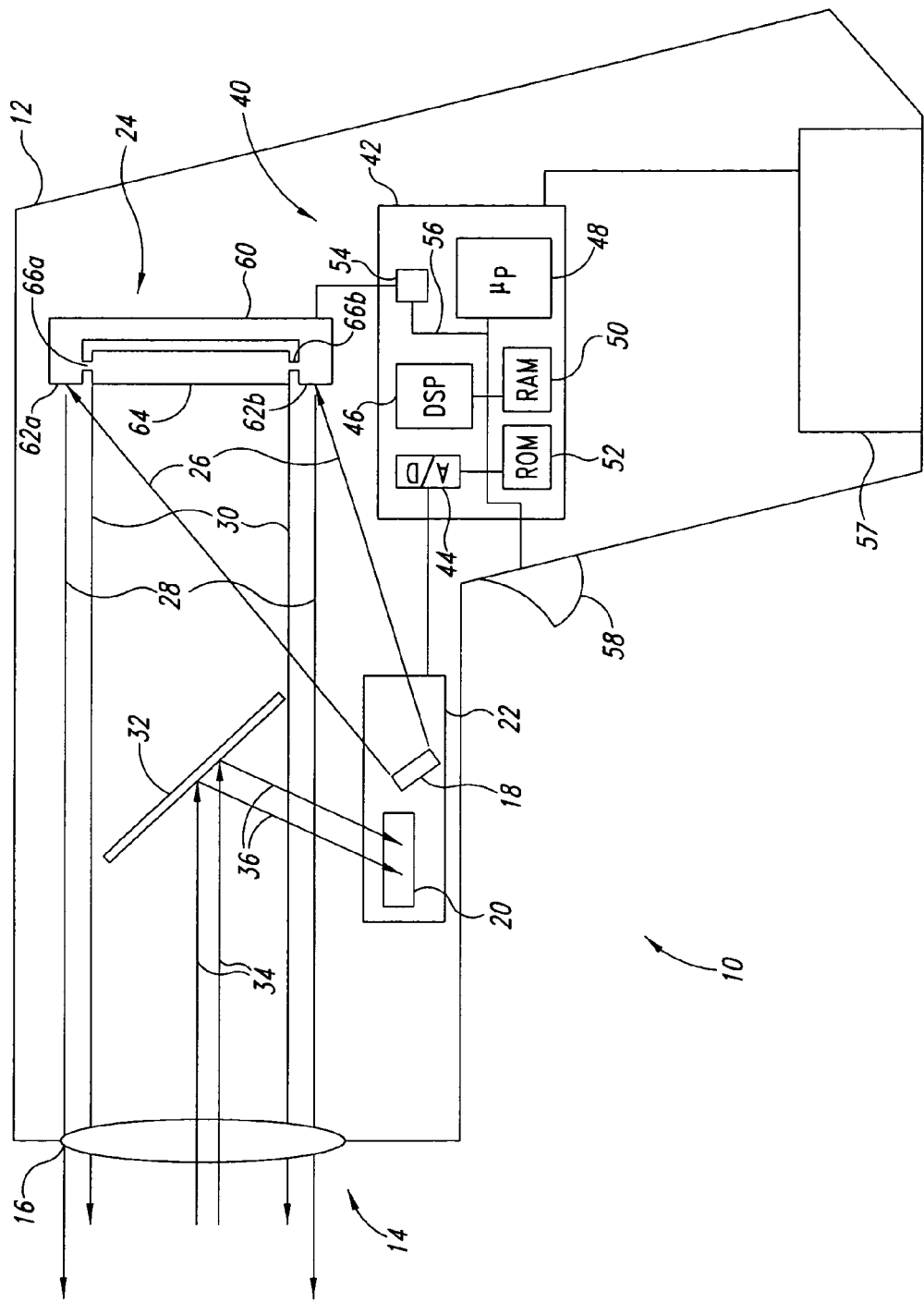
FIG. 1 is a functional block diagram of a machine-readable symbol reader including a reflective assembly operable to produce both a pointer beam and a scanning beam according to one illustrated embodiment.

FIG. 1 shows a machine-readable symbol reader 10 including a housing 12. The machine-readable symbol reader 10 may take any of a variety of forms including fixed forms such as those commonly found at supermarket checkout stands, or hand-held forms such as that illustrated in FIG. 1. The housing 12 typically includes an aperture 14 which may include a lens assembly 16 that allows light to leave and/or enter the housing 12. The lens assembly 16 may focus the light leaving and/or entering the housing 12.

The machine-readable symbol reader 10 includes a illumination source 18 and a photo sensor or detector 20, for example one or more photodiodes, which may be mounted on one or more printed circuit boards 22. The machine-readable symbol reader 10 may also include a reflective assembly 24 positioned to reflect an illumination beam 26 produced by the illumination source 18, out the aperture 14. The machine-readable symbol reader 10 may also include a return light reflector 32 positioned to reflect a return beam of light 34, returned from a target to the detector 20 as illustrated by arrows 36. The target may take the form of a machine-readable symbol, for example a barcode symbol, area or matrix code symbol or stack code symbol.

The machine-readable symbol reader 10 may further include a control subsystem 40 which may be mounted on one or more circuit boards 42. The control subsystem 40 may include an analog-to-digital (A/D) converter 44, digital signal processor (DSP) 46, microprocessor 48, random access memory (RAM) 50, read only memory (ROM) 52, and optionally driver 54, all coupled by one or more buses 56. The A/D converter 44 may convert an analog signal produced by the detector 20 into a digital signal. The control subsystem 40 may optionally include a buffer (not shown), that buffers data from the detector 20 to the A/D converter 44 or DSP 46. The DSP 46 may receive digital data from the A/D converter 44 and decode the data according to any known or future developed decoding algorithms. The microprocessor 48 controls overall operation of the machine-readable symbol reader 10 based on instructions stored in ROM 52 and using the RAM 50 for dynamic storage. The microprocessor 48 may receive user selections from a user input device, such as the trigger 58. The microprocessor 48 may control the reflective assembly 24, for example via a driver 54. While illustrated with a single line, the buses 56 may include separate control, communications and/or power buses.

The reflective assembly 24 is shown in cross-section in FIG. 1 to better illustrate the functional components thereof. As illustrated, the reflective assembly 24 includes a substrate 60, a first reflective face or surface 62a, 62b, a second reflective face 64, and torsion arms 66a, 66b movably attaching the second reflective face 64 to the substrate 60. The torsion arms 66a, 66b allow the second reflective surface 64 to move with respect to the first reflective surface 62a, 62b. In particular, the second surface 64a may rotationally move about an axis defined by the torsion arms 66a, 66b with respect to the first reflective surface 62a, 62b. For example, the second reflective surface 64a may rotationally oscillate or pivot with respect to the first reflective surface 62a, 62b. Alternatively, the second reflective surface 64a may continuously rotate with respect to the first reflective surface 62a, 62b. In the embodiment illustrated in FIG. 1, the second reflective surface 64 is approximately flush or planar with the first reflective surface 62a, 62b.

The reflective assembly may employ standard or conventional reflectors, mirrors and/or prisms, or may employ one or more micro-electro-mechanical systems (MEMS) reflector or micro-mirror, as explained in detail below.

The illumination source 18 produces an illumination beam with sufficient cross-sectional area to cover an area that includes at least a portion of the first reflective surface 62a, 62b, as well as the second reflective surface 64. While illustrated as a diverging beam in FIG. 1, the illumination beam 26 may have a Gaussian profile similar to that commonly associated with typical laser beams. The first reflecting surface 62a, 62b reflects the illumination beam 26 out of the housing 12 to form a pointer beam 28, while the second reflective surface 64 reflects the illumination beam 26 out of the housing 18 to create a scanning beam 30. The return light reflector 32 may selectively pass the outwardly projecting beams 28, 30, while reflecting the inwardly received return beam 34 which is returned from the target.

Figure 2:
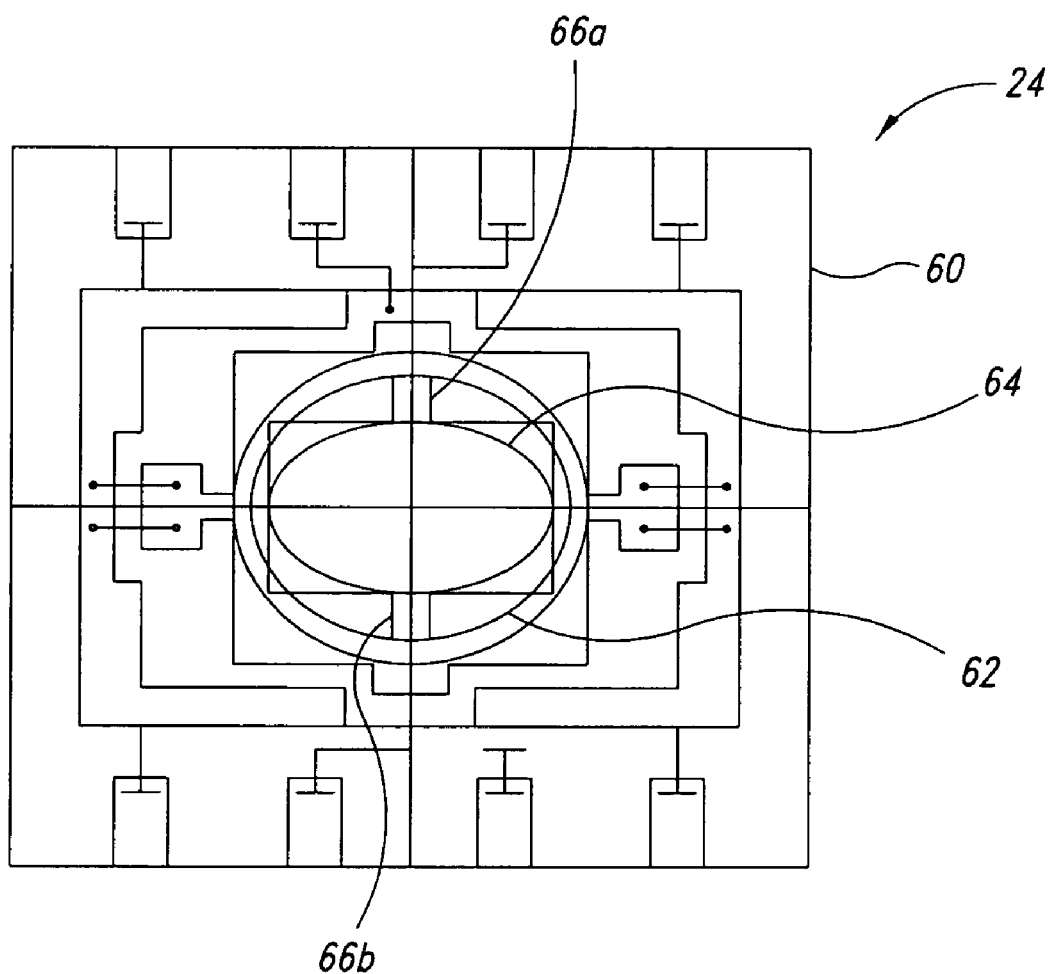
FIG. 2 is a front elevational view of a micro-electro-mechanical system (MEMS) reflector assembly according to one illustrated embodiment, suitable for use in the machine-readable symbol reader of FIG. 1.

FIG. 2 shows a front view of a reflective assembly 24 in the form of a MEMS reflective assembly according to one illustrated embodiment. Generic MEMS fabrication techniques are known in the art and may be applied to create the reflective assembly 24, as are generic techniques for driving MEMS structures. Such techniques will not be discussed further, in the interest of brevity and clarity.

FIG. 3 shows another embodiment of the reflective assembly 24. In particular, in the embodiment of FIG. 3 the second reflective surface 64 is recessed with respect to the first reflective surface 62a, 62b. This is in contrast to the embodiment shown in FIG. 1, where the second reflective surface 64 is flush or planar with the first reflective surface 62a, 62b.

FIG. 4 shows a reflective assembly 24 according to yet another embodiment. In the embodiment of FIG. 4, the first reflective surface 62a, 62b comprises a recessed portion of the substrate 60. Consequently, the first reflective surface 62a, 62b is recessed with respect to the second reflective surface 64. From the above teachings, one of skill in the art will appreciate that other variations and/or combinations for the reflective assembly 24 are possible.

Figure 5:
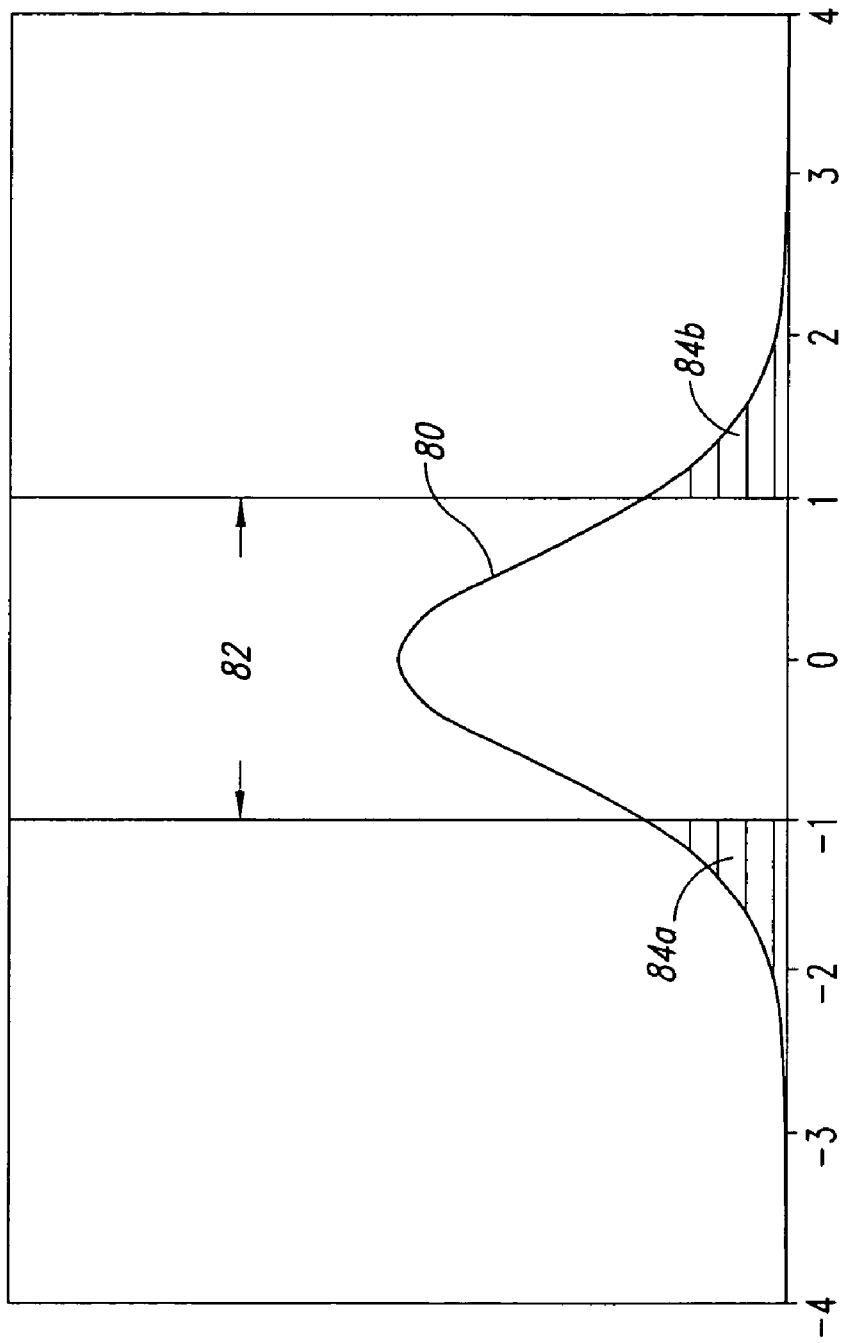
FIG. 5 is a graph illustrating the cross-sectional power distribution of a focused laser beam, a width of a moving second reflective surface with respect to that power distribution, and further illustrating the portion of power reflected from a non-moving first reflective surface, according to one illustrated embodiment.
Figure 7:
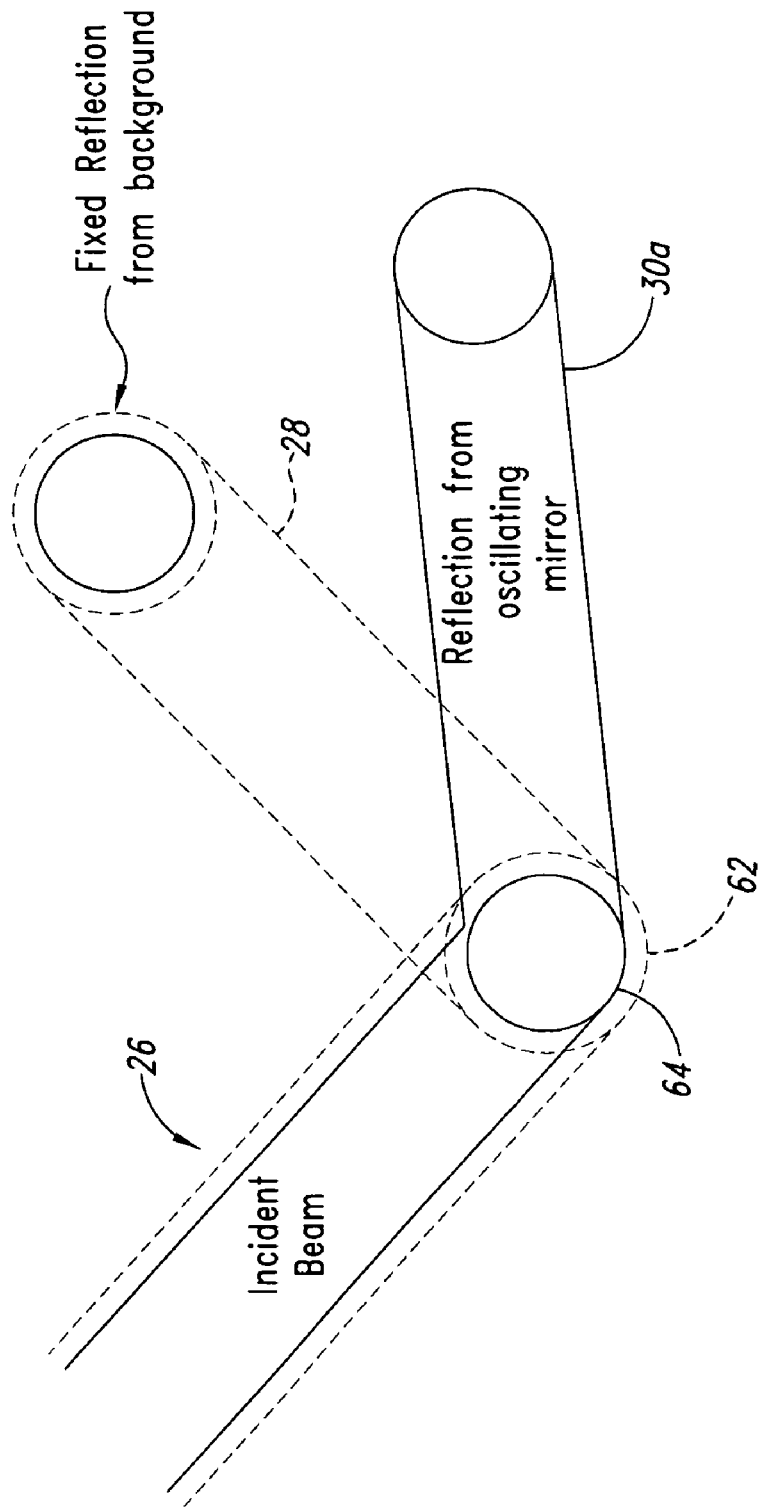
FIGS. 7-11 are schematic views showing the relative positions of the scanning beam and the pointer beam at a number of successive intervals, according to one illustrated embodiment.
Figure 8:
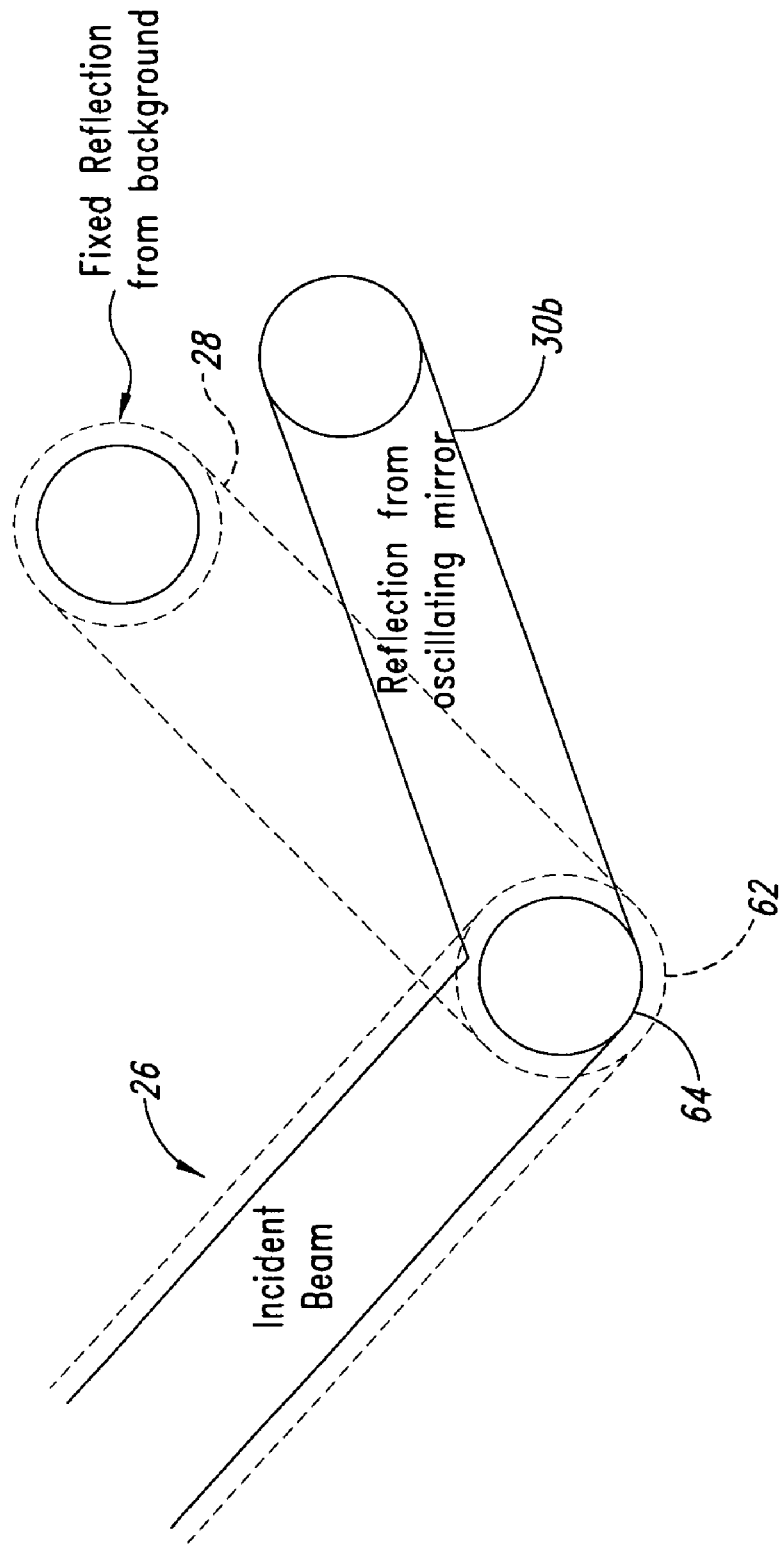
Figure 9:
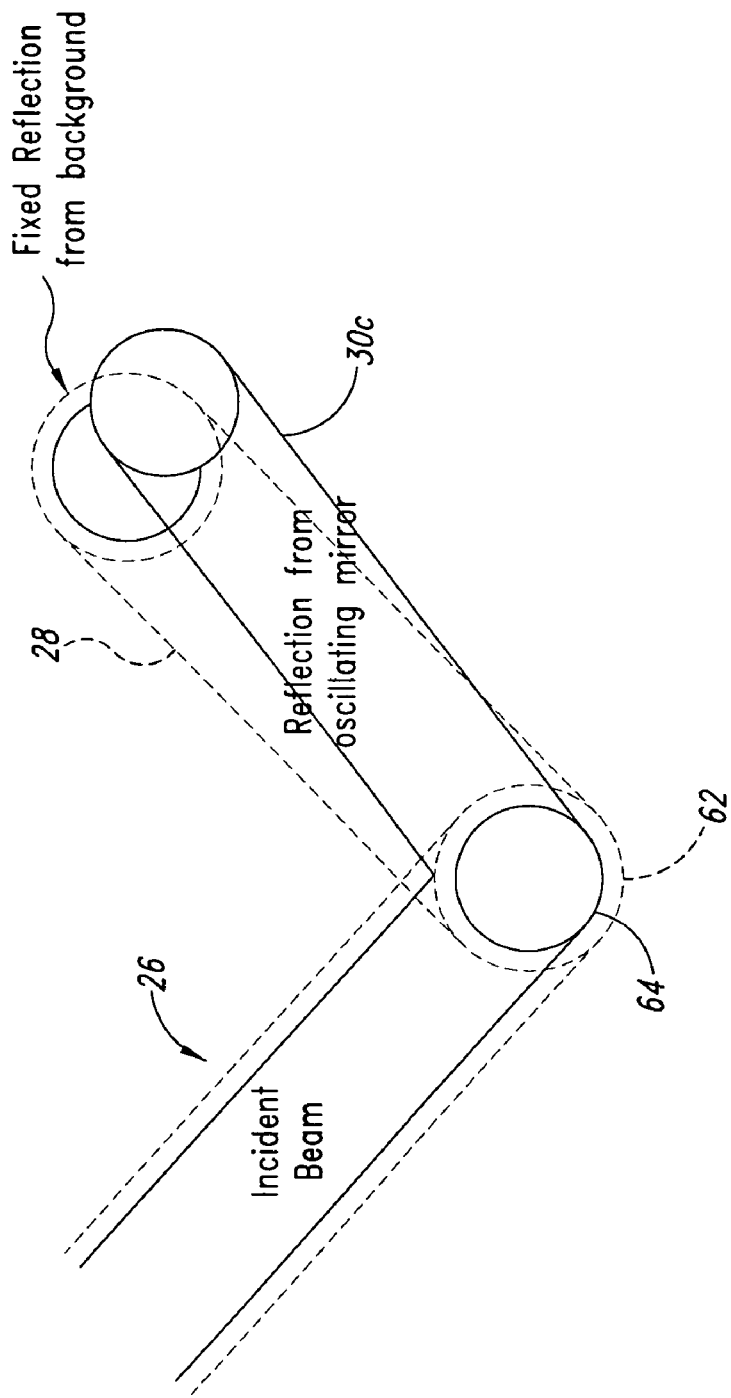
Figure 10:
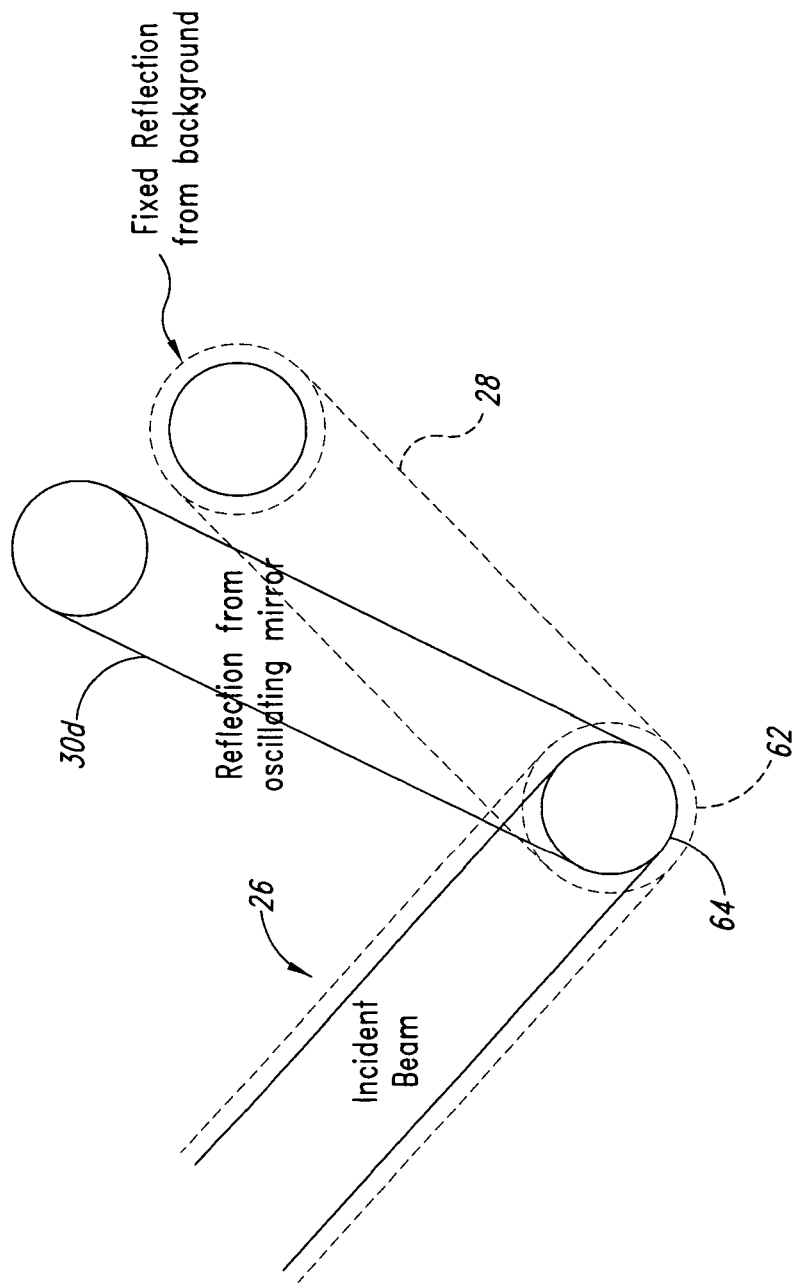
Figure 11:
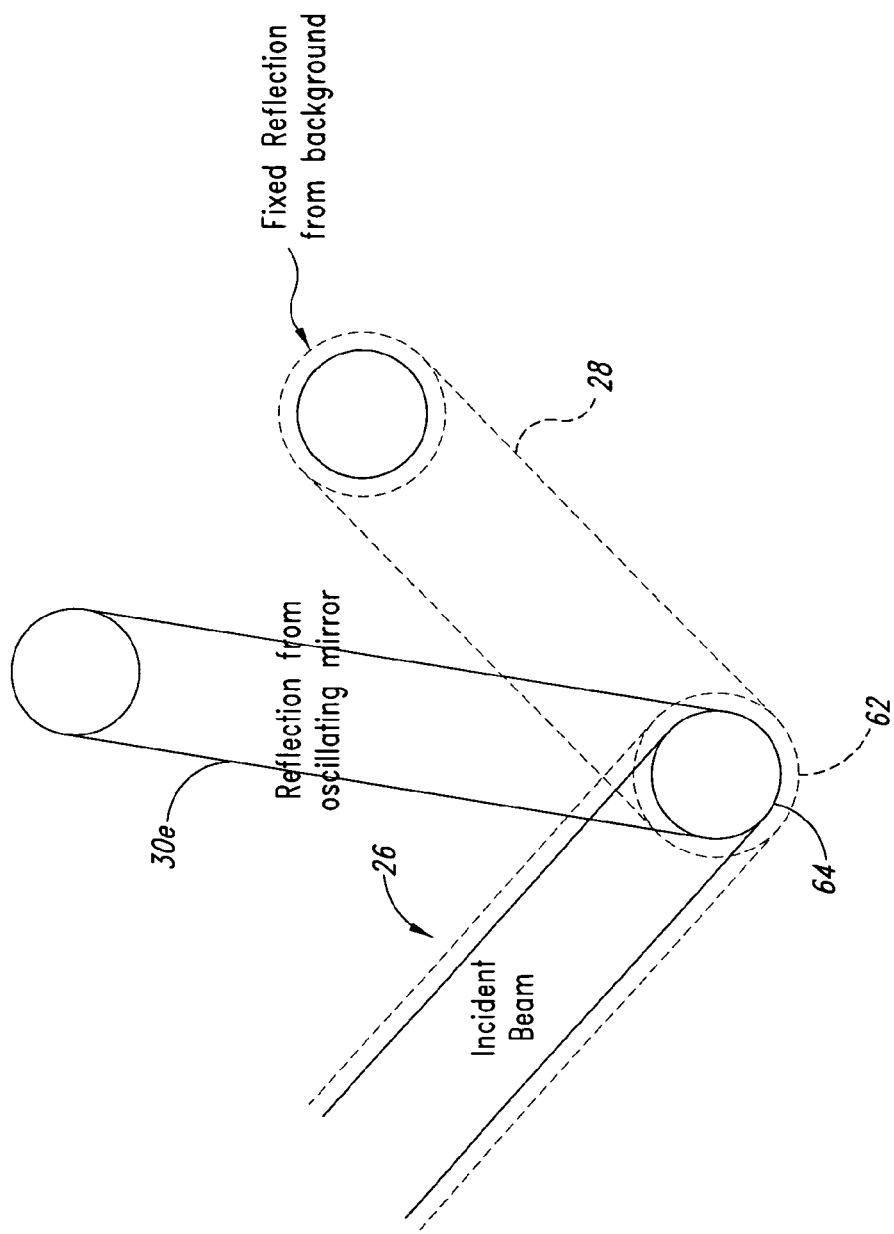

FIG. 5 shows a power profile 80 for a typical laser beam. The profile 80 has a near-Gaussian shape, with an effective aperture width where the power drops as $$\frac{1}{e}$$

of the maximum power. Because of the Gaussian shape, there is considerable power located outside the central density of the beam, in the fringe or wings 84a, 84b. The width of the second reflective surface 64 is also illustrated in FIG. 5. In particular, the power in the wings 84a, 84b of the Gaussian power distribution is used to create the pointer beam 28.

FIG. 6 shows an alternative embodiment. For example, the machine-readable symbol reader 10 may employ an alternative illumination source, comprising a set of light-emitting diodes LEDS 90a-90d mounted on the circuit board 22. Such can be employed in place of the laser source 18. The machine-readable symbol reader 10 may employ a conventional mirror, for example a polygonal mirror 92, with multiple reflective surfaces 64. The polygonal mirror 92 may be mounted in the substrate 60 of continuous rotation about one or more axles 94, and driven by a motor 96 controlled via driver 54 (FIG. 1).

FIGS. 7-11 show the relative positions of the pointer beam 28 and scanning beam 30 at successive intervals. In each instance, the illumination beam 26 illuminates the second reflective surface 64 and at least a portion of the first reflective surface 62. The first reflective surface reflects a portion of the light to create the pointer beam 28, which remains approximately fixed throughout the intervals represented by FIGS. 7-11. As the second reflective surface 64 rotates, for example oscillatingly rotating, the light reflected from the second reflective surface 64 scans across the target. For example, the scanning beam 30 moves from a position illustrated as scanning beam 30a in FIG. 7, to a position illustrated as scanning beam 30b in FIG. 8. The scanning beam 30 continues to move, to a position illustrated as scanning beam 30c in FIG. 9, then to a position illustrated as scanning beam 30d in FIG. 10, followed by a position illustrated as scanning beam 30e in FIG. 11.

Figure 12:
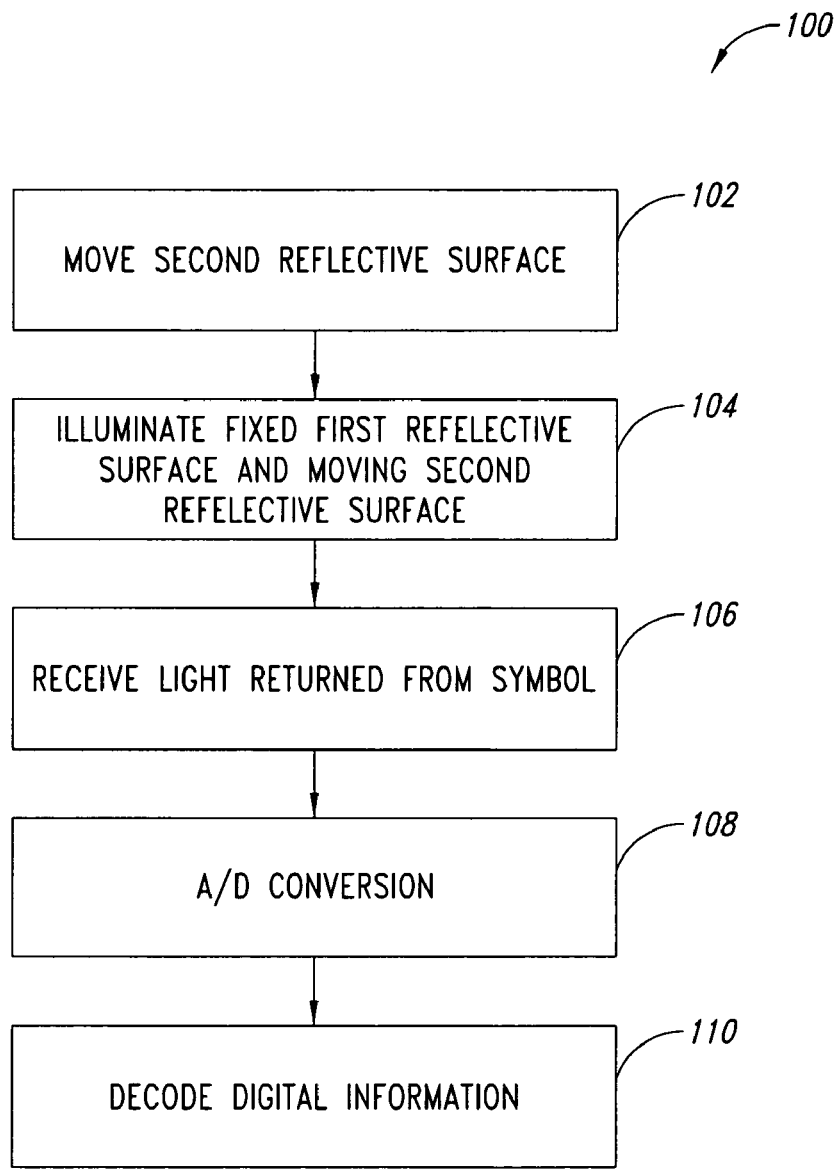
FIG. 12 is a flow diagram showing a method of operating a machine-readable symbol reader employing a reflective assembly according to one illustrated embodiment.

FIG. 12 shows a method 100 of operating a machine-readable symbol reader 10 according to one illustrated embodiment. At 102, the second reflective surface 64 is moved with respect to the first reflective surface 62a, 62b. At 104, the illumination source 18 illuminates at least a portion of the first reflective surface 62a, 62b and the moving second reflective surface 64 to create the pointer beam 28 and scanning beam 30, respectively. At 106, the machine-readable symbol reader 10 receives light returned from the target symbol. At 108, the A/D converter 44 converts the analog signal produced by the detector 20 into a digital signal. At 110, the DSP 46 or, alternately microprocessor 48, decodes the digital signal.

Figure 13:
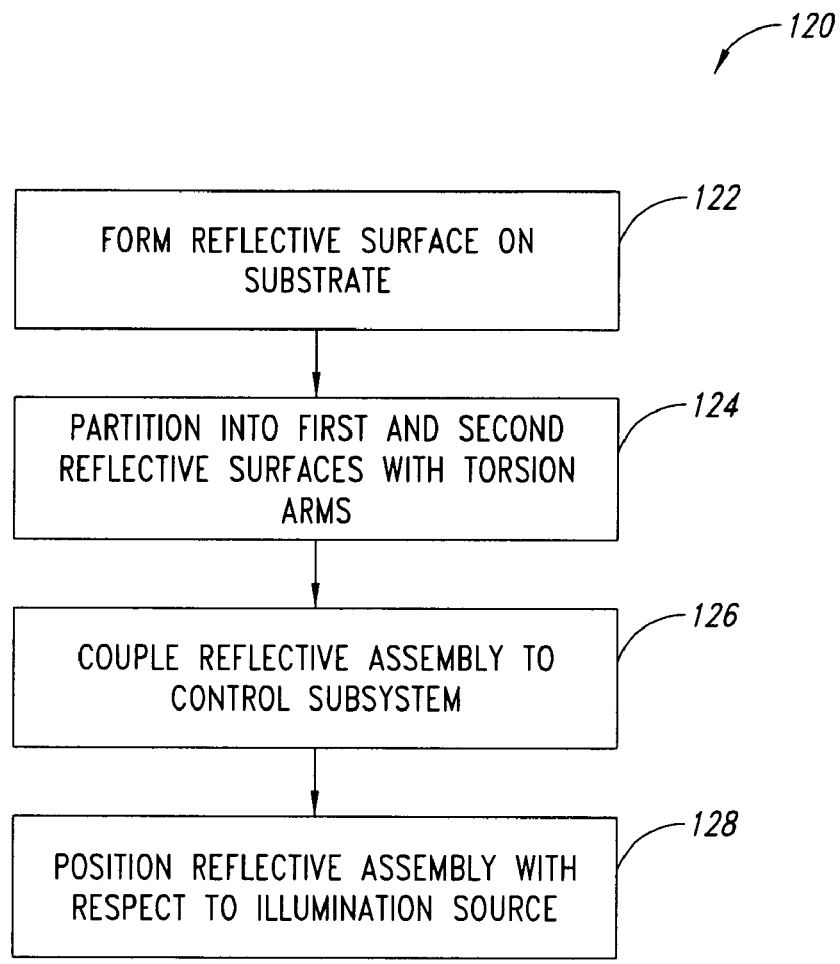
FIG. 13 is a flow diagram showing a method of manufacturing a machine-readable symbol reader including a reflective assembly according to one illustrated embodiment.

FIG. 13 shows a method 120 of manufacturing a machine-readable symbol reader 10 according to one illustrated embodiment. At 122, reflective surfaces 62a, 62b, 64 are formed on the substrate 60 using standard MEMS techniques. At 124, the reflective surface is partitioned into the first reflective surface 62a, 62b and the second reflective surface 64 along with forming the torsion arms 66a, 66b, again using standard MEMS techniques. At 126, the reflective assembly 24 is communicatively coupled to the control subsystem 40. At 128, the reflective assembly 24 is positioned with respect to the illumination source 18.

The method 120 may be performed in a different order, include additional acts or omit some acts. For example, the first and second reflective surfaces 62a, 62b, 64 may be formed at the same time. In such a situation act 122 will proceed at 124. Alternatively, first and second reflective surfaces 62a, 62b, 64 may be formed separately from one another. In such a situation act 124 may proceed act 122.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein can be applied to other machine-readable symbol, not necessarily the exemplary machine-readable symbol reader 10 employing the MEMS based reflective assembly 24 generally described above. For example, the machine-readable symbol reader 10 may employ standard reflectors and mirrors, such as those typically found in current machine-readable symbol readers, so long as the reflectors or mirrors employ a similar topology as that illustrated herein.

Additionally, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. provisional patent application Ser. No. 60/583,406, filed Jun. 25, 2004, are incorporated herein by reference in their entirety. Aspects of the invention can be modified, if necessary, to employ systems, circuits and concepts of the various patents, applications and publications to provide yet further embodiments of the invention.

These and other changes can be made in light of the above-detailed description. In general, in the following claims, the terms used should not be construed to limit the invention to the specific embodiments disclosed in the specification and the claims, but should be construed to include all machine-readable symbol readers and methods of manufacturing and/or operating the same that accord with the claims. Accordingly, the invention is not limited by the disclosure, but instead its scope is to be determined entirely by the following claims.

The invention claimed is:

1. A device to scan machine-readable symbols, the device comprising:
   a first reflective surface having an outer perimeter; and
   a second reflective surface having an outer perimeter, the outer perimeter of the second reflective surface being smaller than the outer perimeter of the first reflective surface, the outer perimeter of the second reflective surface disposed in a volume formed by a normal projection of the outer perimeter of the first reflective surface such that at least a portion of the second reflective surface is exposable to illumination simultaneously with the first reflective surface, and wherein the second reflective surface is mounted for movement about at least a first axis to produce a scanning motion.

2. The device of claim 1, further comprising:
   an illumination source operable to produce an illumination beam and disposed to simultaneously illuminate both the first and the second reflective surfaces.

3. The device of claim 2 wherein the illumination source is a laser.

4. The device of claim 2 wherein the illumination source is at least one light-emitting diode.

5. The device of claim 1 further comprising:
   a drive mechanism.

6. The device of claim 5 wherein the drive mechanism comprises at least one micro-machined torsional arm.

7. The device of claim 5 wherein the drive mechanism comprises an electric motor.

8. The device of claim 1 wherein the second reflective surface is mounted for oscillatory rotational movement.

9. The device of claim 1 wherein the second reflective surface is mounted for continuous rotational movement.

10. The device of claim 1 further comprising:
    a detector sensitive to light and operable to produce a scan profile from light returned from the machine-readable symbol; and
    a decoder subsystem comprising at least one processor configured to decode the scan profile.

11. The device of claim 10, further comprising:
    a housing supportingly receiving the first and the second reflective surfaces, the detector and the decoder subsystem, the housing sized and shaped to be hand-held.

12. The device of claim 1 wherein the first reflective surface is disposed relatively behind the second reflective surface when the second reflective surface is moved to a position that is planar with the first reflective surface.

13. The device of claim 1 wherein the second reflective surface is substantially coplanar with the first reflective surface when the second reflective surface is moved to a position that is planar with the first reflective surface.

14. The device of claim 1 wherein the outer perimeter of the second reflective surface is circular.

15. The device of claim 1 wherein the outer perimeter of the second reflective surface is elliptical.

16. The device of claim 1 wherein the outer perimeter of the first reflective surface is circular.

17. The device of claim 1 wherein the outer perimeter of the first reflective surface is elliptical.

18. The device of claim 1 wherein at least one of the first and the second reflective surfaces is partially reflective and partially transmissive.

19. A device to scan a machine-readable symbol, the device comprising:
    pointer beam means for directing a pointer beam externally from the device; and
    scanner beam means for directing a scanner beam externally from the device while the pointer beam is directed externally from the device, the scanner beam scanning along at least one axis perpendicular to the direction in which the pointer beam is directed externally from the device.

20. The device of claim 19, further comprising:
    illumination means for illuminating at least a portion of the pointer beam means at a same time as at least a portion of the scanner beam means.

21. The device of claim 20 wherein the pointer beam means comprises at least a first reflective surface fixed with respect to the illumination means.

22. The device of claim 21 wherein the scanner beam means comprises at least a second reflective surface rotationally movable with respect to the illumination means.

23. The device of claim 22 wherein the first reflective surface has a first outer perimeter and the second reflective surface has a second outer perimeter smaller than the first outer perimeter, the second outer perimeter disposed in a volume defined by a normal projection of the first outer perimeter from the first reflecting surface.

24. The device of claim 23 wherein the scanner beam means comprises:
 a micro-mirror; and
 a pair of torsional arms oscillatingly supporting the micro-mirror from a substrate.

25. A method of scanning a machine-readable symbol, the method comprising:
 oscillating a scanner reflective surface having a first outer perimeter with respect to an illumination source and a fixed reflective surface having a second outer perimeter greater than the first outer perimeter, the first outer perimeter disposed in a volume formed by a normal projection of the second outer perimeter; and
 illuminating the scanner reflective surface and at least a portion of the fixed reflective surface exposed beyond the first outer perimeter at a same time with a same illumination beam.

26. The method of claim 25, further comprising:
 converting light returned by the machine-readable symbol into a scan profile.

27. The method of claim 26, further comprising:
 decoding the scan profile into human-readable characters.

28. The method of claim 25 wherein the scanner reflective surface is a micro-mirror supported by at least one torsional arm and wherein oscillating a scanner reflective surface comprises selectively applying charges to the micro-mirror.

29. A method of manufacturing an optical system for a machine-readable symbol reader, the method comprising:
 forming a reflective surface on a substrate; and
 partitioning the reflective surface into a first reflective surface portion having a first outer perimeter and a second reflective surface portion having a second outer perimeter, the second outer perimeter disposed within the first outer perimeter and the second reflective surface portion moveably supported from the substrate by at least one support member.

30. The method of claim 29 wherein partitioning the reflective surface comprises micro-machining the first reflective surface as a micro-mirror and micro-machining the at least one support member from the substrate.

31. The method of claim 29 wherein the second outer perimeter is concentrically disposed within the first outer perimeter.

32. The method of claim 29 wherein the at least one support member comprises at least one pair of torsional arms oscillatingly supporting the second reflective portion.

* * * * *